United States Patent [19]
Plummer et al.

[11] Patent Number: 4,814,118
[45] Date of Patent: Mar. 21, 1989

[54] METHOD OF MOLDING A CONNECTOR FOR OPTICAL FIBERS

[75] Inventors: William T. Plummer, Concord; Robert J. Boyea, Wellesley Hills, both of Mass.

[73] Assignee: Polaroid Corporation, Cambridge, Mass.

[21] Appl. No.: 104,506

[22] Filed: Oct. 5, 1987

Related U.S. Application Data

[62] Division of Ser. No. 627,053, Jul. 2, 1984.

[51] Int. Cl.[4] ............................................. B29D 11/00
[52] U.S. Cl. ...................................... 264/2.2; 264/1.5; 264/161; 350/96.20; 425/808
[58] Field of Search .................... 264/2.2, 1.5, 1.7, 1.1; 350/96.18, 96.20, 96.21; 425/808

[56] References Cited

U.S. PATENT DOCUMENTS

| | | | |
|---|---|---|---|
| 4,183,618 | 1/1980 | Rush et al. | 350/96.18 |
| 4,186,995 | 2/1980 | Schumacher | 350/96.20 |
| 4,186,998 | 2/1980 | Holzman | 350/96.21 |
| 4,330,171 | 5/1982 | Malsot et al. | 350/96.21 |
| 4,420,219 | 12/1983 | Muchel | 350/96.18 |
| 4,421,383 | 12/1983 | Carlsen | 350/96.21 |
| 4,531,810 | 7/1985 | Carlsen | 350/96.20 |
| 4,611,884 | 9/1986 | Roberts | 350/96.15 |

FOREIGN PATENT DOCUMENTS

| | | | |
|---|---|---|---|
| 0220690 | 5/1987 | European Pat. Off. | 350/96.21 |
| 2334969 | 7/1977 | France | 350/96.18 |
| 0546568 | 1/1979 | Japan | 350/96.18 |
| 1429843 | 3/1976 | United Kingdom | 350/96.18 |

OTHER PUBLICATIONS

"A Lensed Fiber Connector" by Hargrave, Laser Focus (Oct. 1980), vol. 16, pp. 89 and 90.
"Fiber Optics and Optical Communications" by Carlsen et al, Optical Spectra, vol. 14, No. 10, Oct. 1980.

*Primary Examiner*—James Lowe
*Attorney, Agent, or Firm*—Francis J. Caufield

[57] ABSTRACT

The structure of a miniature component for use in connecting optical fibers along with methods for fabricating the component. A small scale tube having precision surfaces inside and out has formed directly in it a converging, preferably plastic, lens capable of imaging a fiber end properly located into assimilarly situated fiber in another like facing component. The outside precision surfaces of the tube serve as references for precision alignment of the component while its inside precision surfaces aid in formation of the lens.

6 Claims, 2 Drawing Sheets

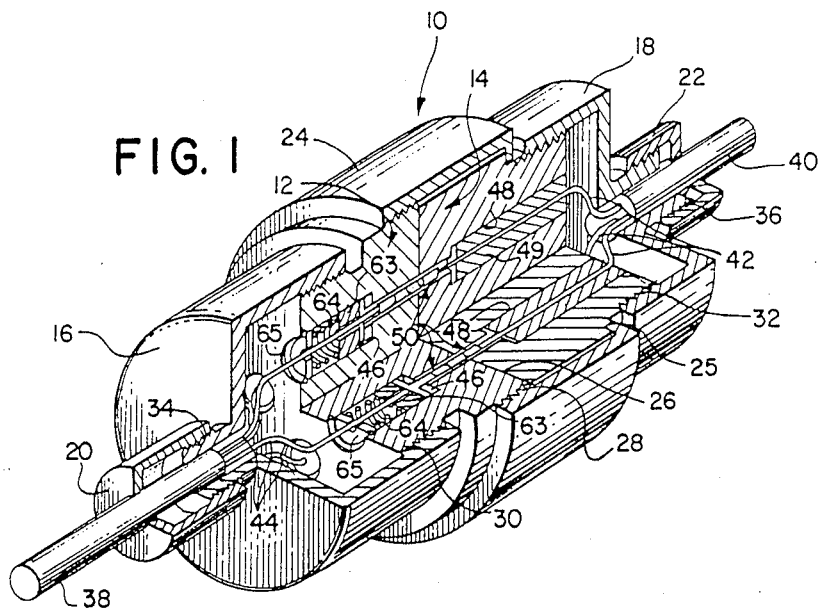
FIG. 1
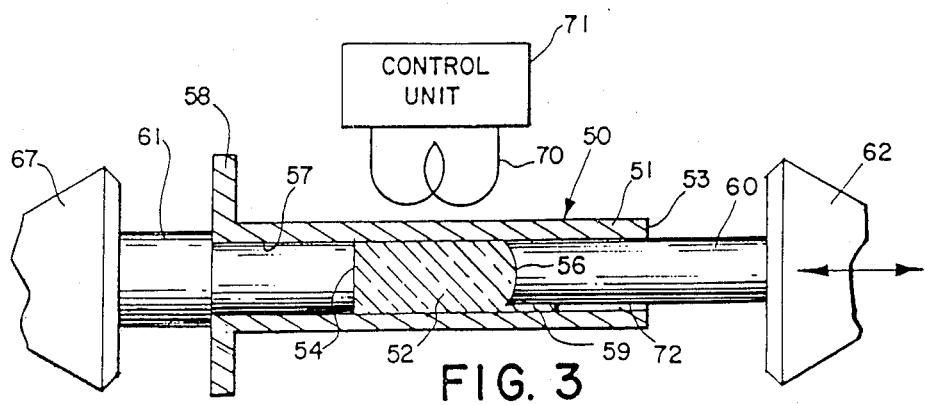
FIG. 2
FIG. 3

METHOD OF MOLDING A CONNECTOR FOR OPTICAL FIBERS

CROSS REFERENCE TO RELATED APPLICATION

This is a division of application Ser. No. 627,053, filed July 2, 1984.

BACKGROUND OF THE INVENTION

This invention in general relates to fiber optic communication systems and in particular to the structure of connectors for joining optical fibers and to methods by which such connectors can be fabricated.

The use of optical fibers as a medium for transmitting high volumes of information over both long distances and throughout local area networks is now a well-established practice known throughout the communications industry.

Optical fibers are hair-like filaments of glass typically having a central region of high index of refraction surrounded by a sheath or cladding region of lower index, a structure which causes optical radiation properly injected into the fiber to propagate along its length and emerge from its distant end.

Although size and information carrying capacity are fundamental reasons responsible for the attractiveness of optical fiber for communications purposes, they are equally reasons underlying the difficulties associated with splicing and connecting fibers wherever required in a communications system. The scale of optical fibers demands high precision in axial, lateral, and angular alignment, and the penalty for lack of precision is large signal loss.

Consequently, the major problems surrounding connectors, i.e., devices by which fibers or bundles of fibers can be coupled and uncoupled some reasonable number of times, are concerns with hardware capable of alignment to a high degree of accuracy, whether mechanical or optical.

The technical problems associated with connectors, along with economic considerations, have required those skilled in the art to pursue solutions along several different lines, each approach with its relative merits. These approaches have resulted in three general types of connector—the groove type, the ferrule type, and the lens type.

With the groove type, the surface of a precision block is provided with fine V-grooves into which the fibers to be aligned are laid and clamped. Coupling of two cable ends is completed by brining the blocks into accurate alignment so that corresponding cores of the fibers in the V-grooves line up with one another.

In the ferrule type, precision ground ferrules are fitted around the ends of fibers and an alignment system is arranged to align the ferrules which, in turn, align the fiber cores.

The lens type of connector attempts to reduce the tolerance requirements on alignment by increasing the apparent size of the fibers so that alignment is of enlarged images of fibers rather than the fibers themselves. This still, however, requires accurate alignment of the fibers with respect to the lens and of the lens to another to complete the connection.

A known solution to the problems associated with the lens connector approach is to use a connector that is injection molded of one plastic piece in which all the precision required is provided for by way of the molding tools and the process for fabricating the piece. Such connectors are referred to as expanded beam types and are of the sort described in U.S. Pat. Nos. 4,183,618; 4,186,995 and 4,421,383. However, injection molding connectors of the scale and precision required is not without challenges as those skilled in the art will appreciate. Consequently, it is a primary object of the present invention to provide the art with a simple lenstype connector which can be easily fabricated.

Other objects of the invention will, in part, be obvious and will, in part, appear hereinafter. The invention, accordingly, comprises the fabrication techniques and the apparatus possessing the construction, combination of elements, and arrangement of parts exemplified in the detailed disclosure which follows.

SUMMARY OF THE INVENTION

This invention in general relates to fiber optic communications systems and in particular to the structure and fabrication of miniature components for use in providing a means by which optical fibers can be releasably connected a reasonable number of times.

The component itself comprises a small tube, preferably of metal composition such as brass, fabricated so that its surfaces, inside and out, are made to tolerances precise enough to align the tube to the accuracy required and to serve as precise molding surfaces.

A converging lens, preferably of plastic, is formed directly inside of the tube by molding and is optically structured to transfer the output from a properly positioned fiber into a similarly situated fiber located in another like facing component.

The lens is thick, has surfaces of form aspheric and plano, and is formed in the tube from a plastic blank having a slightly larger volume of plastic than required for the final nominal lens configuration. The blank is fed into the tube and located there by a plano faced molding pin and then the tube is heated for a predetermined period and temperature. Pressure is applied to the remaining surface with an aspheric molding pin while the blank is soft, and as it cools down, to assure proper lens shape and adherence to the tube inside wall. In addition, flashing due to the excess blank volume forms along one side of tube inside wall to promote further adherence of the lens.

DESCRIPTION OF THE DRAWINGS

The novel features that are considered characteristic of the invention are set forth with particularity in the appended claims. The invention itself, however, both as to its organization and method of operation and fabrication, together with other objects and advantages thereof, will best be understood from the following detailed description of the illustrated embodiment and fabrication steps when read in connection with the accompanying drawings wherein like numbers have been employed in the different figures to denote the same parts and wherein:

FIG. 1 is an enlarged diagrammatic perspective view, with parts broken away, of a connector assembly in which the component of the invention is used to optically connect optical fibers;

FIG. 2 is an enlarged vertical section of a pair of components along with broken parts of other elements seen in FIG. 1;

FIG. 3 is an enlarged diagrammatic view of a component of the invention along with apparatus, shown diagrammatically, used in its fabrication;

DETAILED DESCRIPTION

Figure 4:
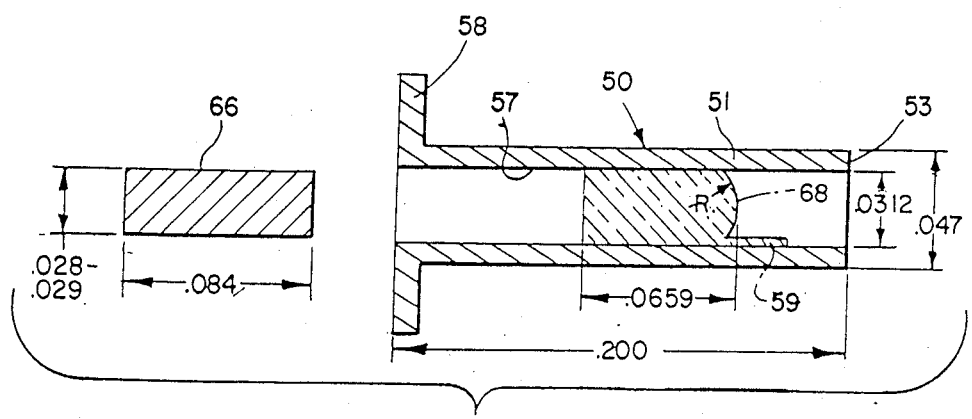
FIG. 4 is an enlarged vertical section of the component of the invention with a lens thereof shown in phantom along with a blank used in forming the lens.
Figure 5:
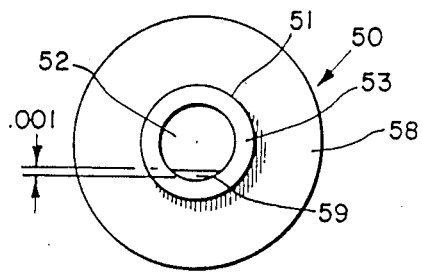
FIG. 5 is an enlarged end view of the component of the invention.

This invention relates to the structure and fabrication of a miniature component that is particularly suitable for use in facilitating releasable connection between optical fibers or bundles of fibers in cable form.

Although the component of the invention can be employed to advantage in a variety of connector assembly configurations which may differ in detail, it is shown in FIG. 1 as part of a connector assembly 10 which is of the type that is useful in providing releasable connections between bundles of optical fibers. However, it will be understood that the component of the invention can as well be used to connect just two fibers or may be used in a hybrid connector in which there is a mix of electrical connector pins with the inventive component which can be made of like scale actually substituting for an electrical contact of the same size.

Referring now to FIG. 1, it can be seen that the assembly 10 comprises two major monoblocks 12 and 14 adapted to receive components 50 made in accordance with the invention. For this purpose, the monoblocks 12 and 14, include a plurality of counterbored holes, 46 and 48, respectively, corresponding to the number of optical fibers to be connected.

The front surfaces of the monoblocks, 12 and 14, butt against one another to form an interface (shown at 26) which is maintained through the use of a slip collar 24. Slip collar 24 screws onto monoblock 12 via threads 28 and in the process draws monoblock 14 against monoblock 12 via a flange 25 provided for this purpose.

Screw caps 16 and 18 are provided to allow access to and protection for the holes, 46 and 48, respectively, and their contents to be described later. Caps 16, and 18, attach to monoblocks 12 and 14 via threads shown at 30 and 32, respectively.

Attachable to each cap 16 and 18 are cable access covers 20 and 22, respectively. Each of these covers has a hole for inserting cables 38 and 40, respectively, and also are configured in a well-known manner to provide strain relief. Covers 20 and 22 screw to caps 16 and 18 via threads 34 and 36, respectively.

Having described the general features of the assembly 10, attention is now directed to the details of the components 50 and the manner in which they are retained and positioned in the assembly 10. However, before proceeding with this, it should be noted that the component 50 is identical in structure wherever it appears in the drawings, but the details of its retention in the monoblocks, 12 and 14, are somewhat different since in monoblock 12 the component 50 is resiliently retained for axial displacement, while in monoblock 14 it is rigidly retained for no motion.

Referring now to FIG. 2 and occasionally back to FIG. 1, it can be seen that the component 50 comprises a cylindrical tube 51 having a rear end in the form of a circular flange 58. The holes 48 in the monoblock 14 are counterbored and dimensioned to receive the tube 51 so that its end face 53 extends to the left just beyond the interface 26 between monoblocks 12 and 14. A solid sleeve 49 is provided for each of the bore holes 48, and this sleeve (49) serves as a spacer being butted against the rear surface of the tube flange 58 and extending to the rear surface of monoblock 14. When the sleeves 49 are in place, they are rigidly affixed to the monoblock 14 through the use of epoxy or other suitable means to assure that the component 50 stays rigidly fixed in place.

The outside dimensions of the component 51 and the inside dimensions of the bore holes 49 are chosen so that the tube 51 is concentric with respect to the center of the bore holes 49 within a few ten-thousandths of an inch to provide precise lateral alignment of the component 50 with respect to the bore holes 49 as well as precise perpendicularity of the end face 53 of the component 50 in the monoblock 14.

The component 50 is resiliently mounted in the bore holes 46 of the monoblock 12. As can be seen in FIG. 2, the end face 53 of the component 50 is recessed into the monoblock 12 just to the left of the interface 26 between the monoblock 12 and the monoblock 14. However, it assumes this position because it is pushed from an initial position in alignment with the interface 26 back to its location shown in FIG. 2 as a result of being engaged by the end face 53 of the component 50 located in the monoblock 14. This is possible because of the resilient mounting arrangement in the monoblock 12 which is responsible for assuring a continuous loading between the interfaces of two of the components 50 forming a connector pair.

In each of the bore holes 46 there is located just behind the component flange 58 first a spacer 63, a compression spring 64, and then a retaining ring 65 to hold the compression spring 64 against the spacer 63 and thus all of these against the rear surface of the flange 58. In this way, the component 50 can slide axially in its bore hole which, incidentally, is counterbored just like that of the monoblock 14 to allow movement of the component 50 along its longitudinal axis. The dimensions again are sufficiently precise to provide concentric alignment of the component 50 within the bore holes 46 to within a few ten-thousandths of an inch.

The tube end face 53 is perpendicular with respect to the longitudinal axis of the tube 51 to within a tenth of a degree so that the total runout across the diameter of the tube 51 is no more than a few ten-thousandths of an inch.

The tube 51 is preferably fabricated of a metal composition such as brass and those skilled in the art will appreciate that the tolerances required can quite easily be achieved routinely with the use of automatic screw machinery, this being a common practice for fabricating precision electrical contacts.

Referring again to FIG. 2, it can be seen that each component 50 includes a thick coverging lens 52 having a rear plano surface 67 and a forward aspheric surface 68. The focus of the lens is shown terminating on its axis at the center of the rear plano surface 67, but it is also possible to have the lens focus at some other location as described in copending application Ser. No. 576,490, now abandoned. The ends of typical fibers 42 and 44 are positioned to be at the focus of the lens 52 through the use of sleeves 54 which position the cores of the fibers 42 and 44 precisely at this point. The sleeves 54 are epoxied in place through the use of some suitable epoxy such as that indicated at 56 so that the ends of the fibers 42 and 44 remain fixed in place with respect to the focus of the lens 52. With this arrangement, a collimated image of the end of the fiber 44 is formed by the left component 50 after which that image is then reconverged so that the end of the fiber 44 is reimaged into the end of the fiber 42 thereby providing an optical path along which optical energy can be transferred from one fiber to the other. The essence of this type of connection is to use two similar connector halves performing like and reversible optical functions. One is used (the one on the left) to enlarge or collimate or roughly collimate radiation emerging from a source fiber (44) accurately placed in one half of the connector at the focus of the lens which forms part of that connector. The other connector half, similar in design to the first, accepts the expanded beam from the first connector half and focuses it into a receiving fiber end (42) located at its axial focus. However, as an alternative, the ends of the fibers 42 and 44 do not need to be precisely located at the focus, but they may be at some other location for enhanced finite imaging and this arrangement has advantages as described in previously mentioned copending application Ser. No. 576,490, now abandoned. The important point to keep in mind is that whatever the requirements are for the location of the fiber ends with respect to the focus of the lens 52, once achieved, the fibers must remain fixed.

Again referring to FIG. 2, it can be seen that the outside surfaces of the tube 51 are used as reference surfaces for concentrically locating tubes with respect to one another and also with respect to the monoblocks, 12 and 14. In addition, the distances of the lens surfaces themselves along the longitudinal optical axis of two connector halves is established by the precision with which the end surfaces 53 are fabricated and this surface, in addition, also establishes the tilt of the lenses 52. Thus, the outside surfaces of the tube 51 provide a means for precisely locating the lens component 50 both axially, laterally and angularly.

The inside surface of the tube 51, which is indicated at 57, is also a precision surface held to within a few ten-thousandths of an inch to act as a reference surface to aid in the formation of the lens 52. The lens 52 is formed in the tube 51 from a plastic blank 66 (FIG. 4) having a slightly larger volume of plastic than required for the final nominal lens configuration.

As best seen in FIGS. 3 and 4, the plastic blank 66 is fed into the tube 51 and located there by a plano faced molding pin 61 located in a collet 67. The tube 51 is then heated by a resistance heating element 70 under the control of a well-known electronic control unit 71 for a predetermined time and temperature. Pressure is applied to the remaining surface of the blank 66 with a molding pin 60 having an aspheric surface 56 complementary in shape to that required for the lens 52. While the blank is soft, and as it cools down, presure is continuously applied to assure proper lens shape and adherence to the inside surface of the tube 51. Suitable stops are provided (not shown) to limit the travel of the molding pin 60.

In addition, the pin 60 is provided with a flat 72 along its peripheral surface to allow excess plastic from the oversized volume of the blank 66 to flow under the flat to form a flashing 59 along one side of the inside wall of the tube 51 to promote further adherence of the lens 52 to the inside surface of the tube 51. Adherence through the use of flashing created by initial excess volume of plastic may be accomplished in other ways such as by providing a hole straight through the wall of the tube 51 and eliminating the flat along one side of the mold pin 60.

One plastic found suitable for molding the lens 52 was PLEXIGLAS® DR100 acrylic plastic manufactured by the Rohm and Hass Corporation of Philadelphia, Pa. When using this plastic with the dimensions illustrated in FIG. 4, the brass tube 51 was heated to a temperature of between 400 and 410° F. for a period of 30 seconds while a constant pressure was applied even after the heat was removed from the tube 51 until the lens 52 solidified. This technique of applying a constant pressure during the cool-down period assures that the desired configuration of the lens 52 is maintained. While only the one plastic was used, it will be apparent to those skilled in the art that other optically suitable plastics can also be used for this purpose. The preferred material composition for the tube 51 is metal, but it is possible that a different material might be used. The only requirement is that the tube have the precision required and does not change with whatever material and process is used to form the lens.

It is possible to depart from the illustrated embodiment and method steps in practicing the teaching of the invention. The lens shown may take on other convergent shapes having, for example, a rear surface that is nearly plano or slightly convex. Also the lens need not be formed of an injection moldable plastic. Liquid epoxy systems can be employed and heat aired inside the tube. There would however be a concern about shrinkage, and the use of the epoxy system would require following the epoxy in with the forming tools as it cured.

Rather than placing the plastic into the tube as a solid blank, it is possible to exude it into the tube under high pressure or as another alternative a suitable curable monomer might be placed in the tube under low pressure.

For purposes of forming connectors employing the component of the invention, it may be desirable to make the inventive components slightly dissimilar in mechanical detail to facilitate coalignment. One end of the component can, for example, be provided with a flare by swaging with precision eyelet machinery.

It will be obvious to those skilled in the art that other changes may be made in the above-described embodiment without departing from the scope of the invention. Therefore, it is intended that all matter contained in the above description or shown in the accompanying drawings shall be interpreted as illustrative and not in a limiting sense.

What is claimed is:

1. A method for making a miniature connector pin for use with plugs to connect optical fibers, said method comprising the steps of:

providing a miniature precision tube with predetermined length, inside and outside precision concentric surfaces, and an endface precisely perpendicular to its longitudinal axis;

supporting said precision tube along its longitudinal axis;

inserting into said precision tube a blank of optical quality lens material of given volume; and directly molding a converging lens within said tube with its optical axis coincident with said longitudinal axis of said tube such that said lens adheres to the inside precision surface of said tube whereby said outside surface and said endface surfaces of said tube serve as references for facilitating positioning said lens.

2. The method of claim 1 wherein said blank comprises an optical plastic.

3. The method of claim 1 further including the step of heating said tube prior to molding said lens.

4. The method of claim 1 wherein said tube comprises a metal and said blank an optical plastic and wherein said method further comprises the step of heating said tube and then forming said lens by molding by placing said blank under pressure with shaped pins adapted to enter each side of said tube trapping said blank between them.

5. The method of claim 4 wherein said blank has a volume of optical plastic larger than the volume of the final configuration of said lens and wherein at least one of pins includes a relief into which said excess volume of said blank flows during molding to form a flashing to promote adherence of said lens to the inside surface of said tube.

6. The method of claim 4 wherein said metal is brass.

* * * * *